H. P. MACDONALD.
COUPLING OR JOINT.
APPLICATION FILED FEB. 4, 1919.

1,360,555.

Patented Nov. 30, 1920.

WITNESS:

INVENTOR
Harry P Macdonald
BY
ATTORNEYS.

UNITED STATES PATENT OFFICE.

HARRY P. MACDONALD, OF MONTCLAIR, NEW JERSEY, ASSIGNOR TO THE SNEAD & CO. IRON WORKS, OF JERSEY CITY, NEW JERSEY, A CORPORATION OF NEW JERSEY.

COUPLING OR JOINT.

1,360,555.     Specification of Letters Patent.     Patented Nov. 30, 1920.

Application filed February 4, 1919. Serial No. 274,921.

*To all whom it may concern:*

Be it known that I, HARRY P. MACDONALD, a citizen of the United States, residing at Montclair, in the county of Essex and State of New Jersey, have invented certain new and useful Improvements in Couplings or Joints, of which the following is a specification.

This invention relates to couplings or joints, and particularly to flexible and universal joints, such as are useful, for example, in connecting the ends of a driving and a driven shaft. My improvements are especially useful in automobile service to take the place of the ordinary flexible and universal joints employed in various parts of the transmission as, for example, the joint located between the gear box and the clutch, and the joint connecting the rear end of the drive shaft coming out of the gear box to the front end of the propeller shaft leading to the rear axle. These joints have usually been of the two pin universal type or of the disk type, in which plain flat disks of steel, leather or fabric are employed. The leather disks soon become hard and are liable to crack and they do not have uniform strength in all directions; the plain disks have a tendency to crack through crystallization; and the fabric disks are expensive.

One of the primary objects of my invention is to provide a joint which is simple in construction, easy and inexpensive to manufacture, and which overcomes the foregoing difficulties, the joint being suitable for use either as a flexible or as a universal joint.

Figure 1:
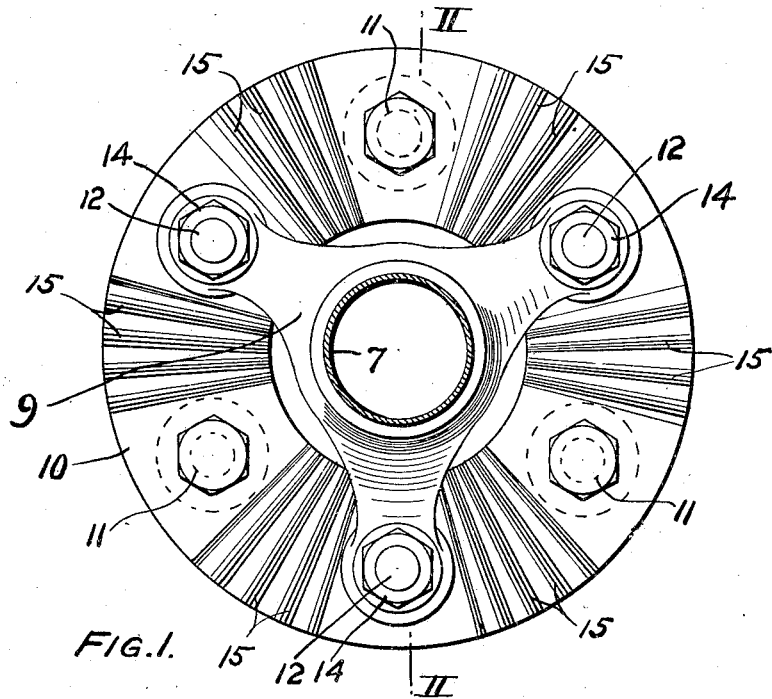
Figure 2:
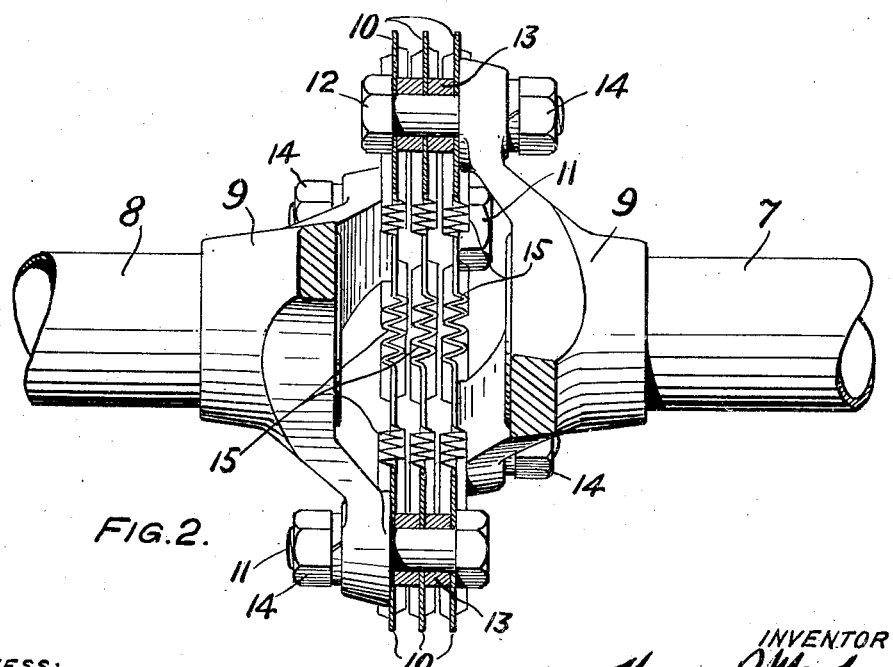

I accomplish the foregoing, together with such other objects as may hereinafter appear, by means of a construction which I have illustrated in the accompanying drawings, wherein:

Figure 1 is a section taken through a shaft illustrating the improved joint in end elevation; Fig. 2 is a side elevation of the joint, a portion thereof being shown in a section taken on the irregular line II—II of Fig. 1.

Referring now to the drawings, the reference numeral 7 may be taken as indicating a driving shaft, and the reference numeral 8 a driven shaft. At adjacent ends each shaft has a flange or three-armed spider 9 secured in the manner described and claimed in my co-pending application, Serial Number 273,974 filed January 30, 1919. One or more thin sheet steel plates 10 is, or are, interposed between the faces of the spiders and suitably apertured to receive the sets of bolts 11 and 12. The bolts 11 are carried by the spider on the driven shaft, and the bolts 12 by the spider on the driving shaft. Where more than one steel plate 10 is employed, the plates are separated by means of washers 13. It will be seen that when the nuts 14 are tightened, the disks will be securely and rigidly attached to both spiders.

The disks are preferably composed of an alloy steel such, for example, as nickel or chrome vanadium, and they are pressed in the form indicated in the drawings; that is, at points intermediate the bolt receiving holes, the plates are crimped or corrugated as indicated at 15, such corrugations being preferably radially disposed. The disks are preferably heat treated so as to have superior physical properties.

It will be seen from the foregoing that the plates constitute a flexible connecting link between the two spiders, the corrugations of the disks allowing them to bend to accommodate any angle between the shafts which are connected, the corrugations further permitting of a spring or shock absorbing action between the driving and the driven shafts, as it can be readily seen that under a sudden load the corrugations will become alternately wider or narrower, as the load varies.

The power is transmitted by the pull across the disks and to some extent by the compression; that is to say, adjacent groups of corrugations will alternately be in tension or under compression, but the form of the disks is such that the disks yield to the compressive strains or tensile stresses without taking a permanent set or becoming permanently deformed. It will also be apparent that the construction of the disks is such as to yield or spring, during revolution, if one shaft is disposed at an angle with respect to the other, without taking a set.

I claim:

1. A joint for connecting shafts and the like, comprising one or more disk-like metal members provided with flat portions having apertures therethrough and with radially corrugated portions intermediate the flat portions and bolt means for coupling the same to the respective shafts.

2. A joint for connecting shafts and the like, comprising one or more disk-like metal members provided with radial corrugations increasing in dimension outwardly, and means for coupling the same to the respective shafts.

3. A joint for connecting shafts and the like, comprising in combination one or more disk-like metal members, means to connect the same to one of the shafts, and means to connect the same to the other of the shafts, said means being offset with respect to each other, said disk-like member or members being flat at the points of connection and deformed intermediate the said two means so as to yield elastically.

In testimony whereof, I have hereunto signed my name.

HARRY P. MACDONALD.